(12) United States Patent
Barnes et al.

(10) Patent No.: US 6,427,911 B1
(45) Date of Patent: *Aug. 6, 2002

(54) BILLING/CLEARING HOUSE SYSTEM AND METHOD FOR AN OVERLOADED CARD

(75) Inventors: Stacey Alan Barnes, Round Rock; Viktors Berstis, Austin, both of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/465,292

(22) Filed: Dec. 17, 1999

(51) Int. Cl.[7] .................................................. G06K 5/00
(52) U.S. Cl. ........................ 235/380; 235/379; 235/487; 705/40
(58) Field of Search ................................ 235/380, 379, 235/487; 705/40

(56) References Cited

U.S. PATENT DOCUMENTS

| | | | |
|---|---|---|---|
| 4,443,027 A | | 4/1984 | McNeely et al. |
| 4,575,621 A | | 3/1986 | Dreifus |
| 4,593,936 A | | 6/1986 | Opel |
| 4,614,861 A | * | 9/1986 | Pavlov et al. ................ 235/380 |
| 4,700,055 A | | 10/1987 | Kashkashian, Jr. |
| 4,717,815 A | | 1/1988 | Tomer |
| 4,766,293 A | | 8/1988 | Boston |
| 4,766,294 A | | 8/1988 | Nara et al. |
| 4,771,460 A | | 9/1988 | Tamada et al. |
| 4,797,542 A | | 1/1989 | Hara |
| 4,800,255 A | | 1/1989 | Imran |
| 4,806,745 A | | 2/1989 | Oogita |
| 4,812,634 A | | 3/1989 | Ohta et al. |
| 4,851,654 A | | 7/1989 | Nitta |
| 4,868,376 A | | 9/1989 | Lessin et al. |
| 4,874,934 A | | 10/1989 | Nakahara et al. |
| 4,876,441 A | | 10/1989 | Hara et al. |
| 4,973,828 A | | 11/1990 | Naruse et al. |
| 5,055,662 A | | 10/1991 | Hasegawa |
| 5,072,103 A | | 12/1991 | Nara |
| 5,223,699 A | * | 6/1993 | Flynn et al. ................ 235/380 |
| 5,239,583 A | | 8/1993 | Parrillo |
| 5,276,311 A | | 1/1994 | Hennige |

(List continued on next page.)

FOREIGN PATENT DOCUMENTS

| | | |
|---|---|---|
| DE | 004138131 A1 | 4/1993 |
| JP | 404367090 A | 12/1992 |
| JP | 405210771 A | 8/1993 |

OTHER PUBLICATIONS

U.S. application No. 09/465,290, Stacey Alan Barnes et al., filed Dec. 17, 1999, co–pending.
U.S. application No. 09/465,293, Stacey A. Barnes, et al., filed Dec. 17, 1999, co–pending.
U.S. application No. 09/465,293, Stacey Barnes, et al., filed Dec, 17, 1999, co–pending.

*Primary Examiner*—Karl D. Frech
*Assistant Examiner*—Uyen-Chau Le
(74) *Attorney, Agent, or Firm*—Marilyn Smith Dawkins; Bracewell & Patterson, L.L.P.

(57) ABSTRACT

A system and method for managing an overloaded card with billing/clearing house services to a user of the card. The host card is set up as an overloaded card to which a card provider server system provides the overloaded card services. The overloaded card with the overloaded services is managed such that card transactions are tracked, and the user is respectively billed for the transactions. The transactions are cleared before billing the transactions to the user. All information relating to the transactions are consolidated on a single statement that is provided to the user. The overloaded card manager is used to manage the overloaded card and its services and provide the billing/clearing house services.

20 Claims, 9 Drawing Sheets

U.S. PATENT DOCUMENTS

| | | |
|---|---|---|
| 5,324,922 A | 6/1994 | Roberts |
| 5,388,148 A | 2/1995 | Seiderman |
| 5,477,040 A | 12/1995 | Lalonde |
| 5,478,994 A | 12/1995 | Rahman et al. |
| 5,521,363 A * | 5/1996 | Tannenbaum ............... 235/379 |
| 5,530,232 A | 6/1996 | Taylor |
| 5,546,523 A | 8/1996 | Gatto |
| 5,550,897 A | 8/1996 | Seiderman |
| 5,559,313 A * | 9/1996 | Claus et al. ................ 235/380 |
| 5,578,808 A | 11/1996 | Taylor |
| 5,590,038 A * | 12/1996 | Pitroda ....................... 235/380 |
| 5,627,355 A | 5/1997 | Rahman et al. |
| 5,682,027 A | 10/1997 | Bertina et al. |
| 5,714,744 A | 2/1998 | Brice |
| 5,731,575 A | 3/1998 | Zingher et al. |
| 5,801,367 A | 9/1998 | Asplund et al. |
| 5,850,599 A | 12/1998 | Seiderman |
| 5,859,419 A * | 1/1999 | Wynn ......................... 235/487 |
| 5,875,437 A | 2/1999 | Atkins ......................... 705/40 |
| 5,884,271 A | 3/1999 | Pitroda |
| 5,936,221 A | 8/1999 | Corder et al. |
| 5,955,961 A | 9/1999 | Wallerstein ................. 235/380 |
| 6,038,551 A * | 3/2000 | Barlow et al. .............. 235/380 |
| 6,068,183 A | 5/2000 | Freeman et al. |
| 6,145,739 A | 11/2000 | Bertina et al. |
| 6,216,955 B1 | 4/2001 | Le Roux et al. |

\* cited by examiner

BILLING/CLEARING HOUSE SYSTEM AND METHOD FOR AN OVERLOADED CARD

RELATED APPLICATIONS

The present invention is related to the subject matter of commonly assigned, copending U.S. patent applications: Ser. No. 09/465,292; Ser. No. 09/465,290; Ser. No. 09/465,291; and Ser. No. 09/465,293. The content of the above-identified applications is incorporated herein by reference.

BACKGROUND OF THE INVENTION

1. Technical Field

The present invention relates in general to a a billing/clearing house system and method for an overloaded card, and, in particular, to a system and method for managing an overloaded card which is an existing card that has its own card service(s) that is overloaded with services for other cards wherein the existing card is the only card that has to be used and providing billing/clearing house services and billing/clearing house management for the overloaded card and its associated services. Still particularly, the present invention relates to a billing management system and method for an overloaded card for providing a clearing house for charges made using the overloaded card and for consolidating the charges into a single bill for the card holder or user.

2. Description of the Related Art

A person may typically carry a various number of cards, such as credit cards, driver's license card, membership cards, etc., with him or her. However, the carrying of so many cards may be quite cumbersome and bulky for a person. For example, the large number of cards may cause a person's wallet to bulge. Also, the tasks of managing and tracking so many cards may become quite a hassle or burden.

Various types of universal cards or smart cards have been developed to integrate convenience and usability of multiple cards of a user into a single card. For these types of universal cards or smart cards, a generic universal card or generic smart card is provided, and the card services from all the different cards that a person owns is associated and programmed to the single universal card or smart card. The single generic card is generally used to integrate card services from various cards, and the card itself has no other functions or inherent operations. Some of these universal cards or smart cards require changing, updating, and/or maintaining of stored data on the cards themselves or may require the informing of the card service providers of the various cards regarding the integration of the cards to the universal card or smart card. Furthermore, some of these universal cards or smart cards require a power source to maintain, store, and/or display the data on the card. U.S. Pat. No. 5,530,232 to Taylor; U.S. Pat. No. 4,700,055 to Kashkashian Jr.; U.S. Pat. No. 4,443,027 to McNeely et al.; U.S. Pat. No. 5,546,523 to Gatto; U.S. Pat. No. 4,593,936 to Opel; U.S. Pat. No. 5,276,311 to Hennige; U.S. Pat. No. 5,477,040 to Lalonde provide examples of such universal cards or smart cards.

However, the problem with universal cards or smart cards is that they require the providing of the additional generic cards that are not themselves inherently functional or operational cards. For authentication purposes, a vendor or business establishment may not simply accept the universal card or smart card on its face value and may still require seeing and verifying the existence of the actual, real card itself that has been integrated into the universal card or smart card. This requirement defeats one of the main purposes of having a universal card or smart card since the person would still have to carry the cards that were integrated into the single universal card or smart card in the event of an authentication or verification request.

Furthermore, the integration of several cards and their card services into one single card results in a management problem in that the services of all the cards associated to the single card have to be carefully tracked and maintained by the card user. However, such a management task may be extremely cumbersome and tedious. For example, if a card user wishes or needs to change his/her billing address, then the card user has to remember every card with a respective card service that has been associated to the universal single card. The card user then has to contact every respective card service provider for each of the cards associated to the universal single card. Furthermore, if the card user wishes to change using his/her present universal single card to using another universal single card, then the card user has to engage in the tedious tasks of tracking and remembering all of the card information associated with the first universal card, canceling the first universal card and its services, and setting up and programming the second universal card and its respective services with all of the information from the first universal card and any other new information.

Also, the billing of charges made on a universal card also needs to be managed and/or tracked. Without any billing management, the universal card is used by a user, and the respective card service providers receive the charges made at corresponding business establishments or vendors. The billing service providers for the card service providers, in turn, bill the user for the charges. The user receives bills from each of these service providers for the various accounts utilized on the universal card. A summary of charges for the universal card is not readily available, and the user is not able to readily manage or track billing activities on his/her universal card. The user is not able to obtain a single bill summarizing all charges made by the universal card. Also, a central clearing house for charges made on all accounts associated to the universal card would be desired since it would act as an efficient check and further security mechanism on charges made by using a universal card.

It would therefore be advantageous and desirable to provide a billing/clearing house system and method for a universal card. It would also be advantageous and desirable to provide a card management system for managing services of the universal card wherein the card management system allows easy or automatic updating or changing of information relating to the universal card and universal card services and wherein the card management system is able to provide billing/clearing house services for all of the cards associated to the universal card. It would further be advantageous and desirable to allow a user to be able to readily manage or track billing activities on his/her universal card and to obtain a single bill summarizing all charges made by the universal card. It would still further be advantageous and desirable to provide a central clearing house for charges made on all accounts associated to the universal card wherein the clearing house at least acts as an efficient check and further security mechanism on charges made by using a universal card.

SUMMARY OF THE INVENTION

It is therefore one object of the present invention to provide a billing/clearing house system and method for an overloaded card.

It is another object of the present invention to provide a card management system for managing services of the overloaded card wherein the card management system allows easy or automatic updating or changing of information relating to the overloaded card and overloaded card services and wherein the card management system is able to provide billing/clearing house services for all of the cards associated to the overloaded card.

It is a further object of the present invention to allow a user to be able to readily manage or track billing activities on his/her overloaded card and to obtain a single bill summarizing all charges made by the overloaded card.

It is still a further object of the present invention to provide a central clearing house for charges made on all accounts associated to the overloaded card wherein the clearing house at least acts as an efficient check and further security mechanism on charges made by using an overloaded card.

The foregoing objects are achieved as is now described. A system and method of providing, using, and managing an overloaded card with overloaded card services and providing billing services to a user of the overloaded card. An existing card is associated with an associated card service that is used by the user. The existing card is set up as the overloaded card with the overloaded card services by associating at least one other service of at least one other card to the existing card. An overloaded card provider server system provides the overloaded card with overloaded card services. The existing card is used as the overloaded card with the overloaded services which include the associated card service and at least one service. The overloaded card with the overloaded services is managed. Transactions of the overloaded card are tracked, and the user is respectively billed for the transactions. The transactions are cleared before billing the transactions to the user. All information relating to the transactions are consolidated on a single statement that is provided to the user. The overloaded card manager is used to manage the overloaded card and its services and provide the billing/clearing house services.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention provides a billing/clearing house system and method for an overloaded card. The present invention also provides a card management system for managing services of the overloaded card. The card management system allows easy or automatic updating or changing of information relating to the overloaded card and overloaded card services, and the card management system is able to provide billing/clearing house services for all of the cards associated to the overloaded card.

Furthermore, the present invention allows a user to be able to readily manage or track billing activities on his/her overloaded card and to obtain a single bill summarizing all charges made by the overloaded card. Also, the present invention provides a central clearing house for charges made on all accounts associated to the overloaded card wherein the clearing house at least acts as an efficient check and further security mechanism on charges made by using an overloaded card. The overloaded card manager is for managing an overloaded card. The overloaded card manager has been disclosed in detail in the co-pending U.S. application Ser. No. 09/465,291 entitled "OVERLOADED CARD MANAGER", and the overloaded card has been disclosed in detail in the co-pending U.S. application Ser. No. 09/465,292 entitled "SYSTEM AND METHOD FOR OVERLOADING AN EXISTING CARD".

In the present invention disclosed in the figures, the users 15 may be one or more among a number of various card holders or users, such as User A 15A, User B 15B, User C 15C . . . , User N 15N. The card 18 may be one of a number of various cards, such as card A 18A, card 18B, card 18C, . . . , card Z 18Z with respective card service CSA 20A, CSB 20B, CSC 20C, . . . , CSZ 20Z provided by the respective card service provider CSP A 17A, 17B, 17C, . . . , CSP 17Z. The overloaded card (OC) is designated and set up to be one of the cards 18 (i.e. may be card A 18A, card 18B, card 18C, . . . , or card Z 18Z). A number OCs 18 may be set up, and it may be one of a number of OCs, such as OCA, OCB, OCC, . . . , OCY.

Figure 1:
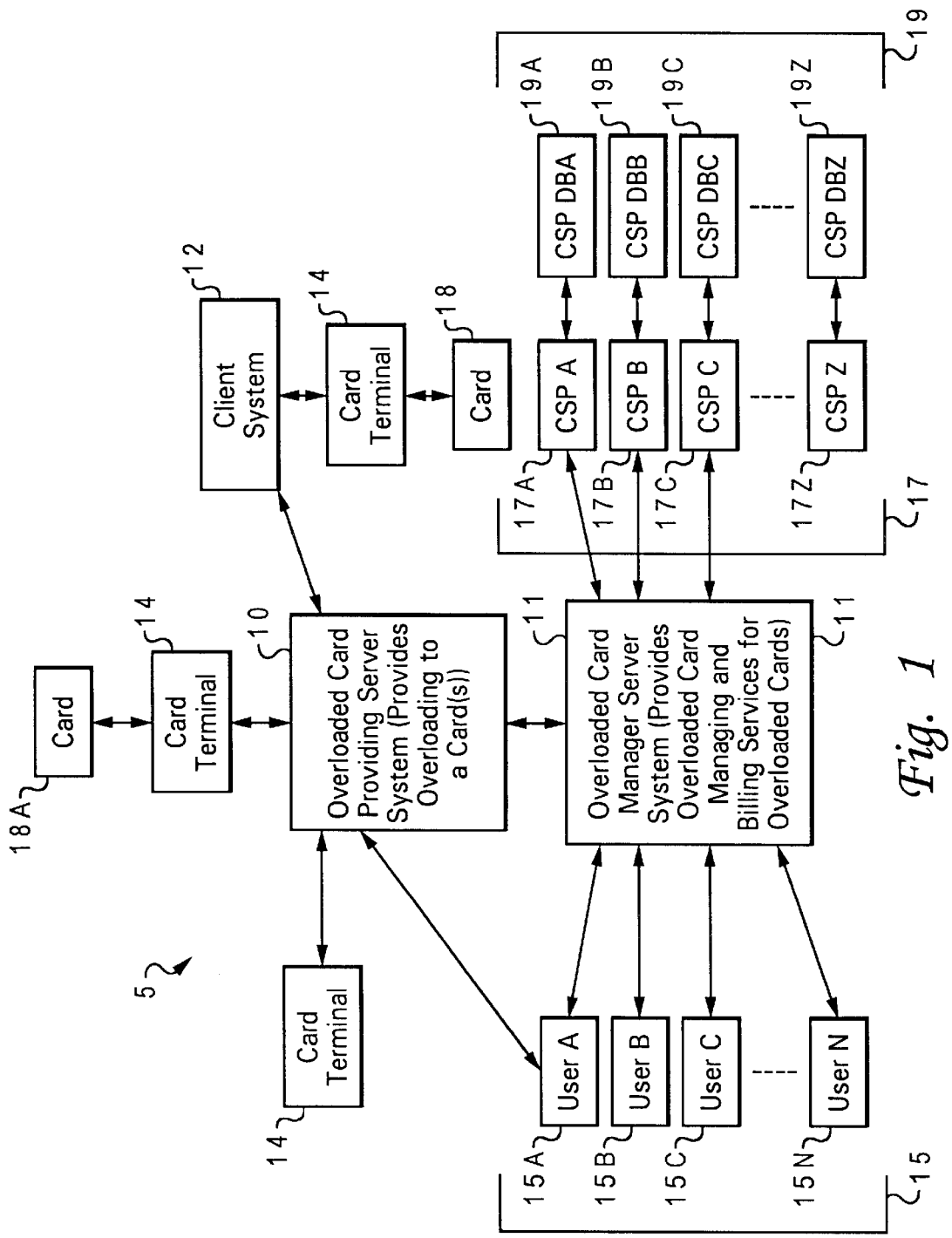
FIG. 1 is a block diagram illustrating a general topology of and relationship between card terminals, a client system, users, card service providers, an overloaded card providing server system that provides overloaded card services for overloaded cards, and an overloaded card manager server system that manages each of the overloaded cards with their respective services and provides the present invention billing/clearing house services for an overloaded card.
Figure 3:
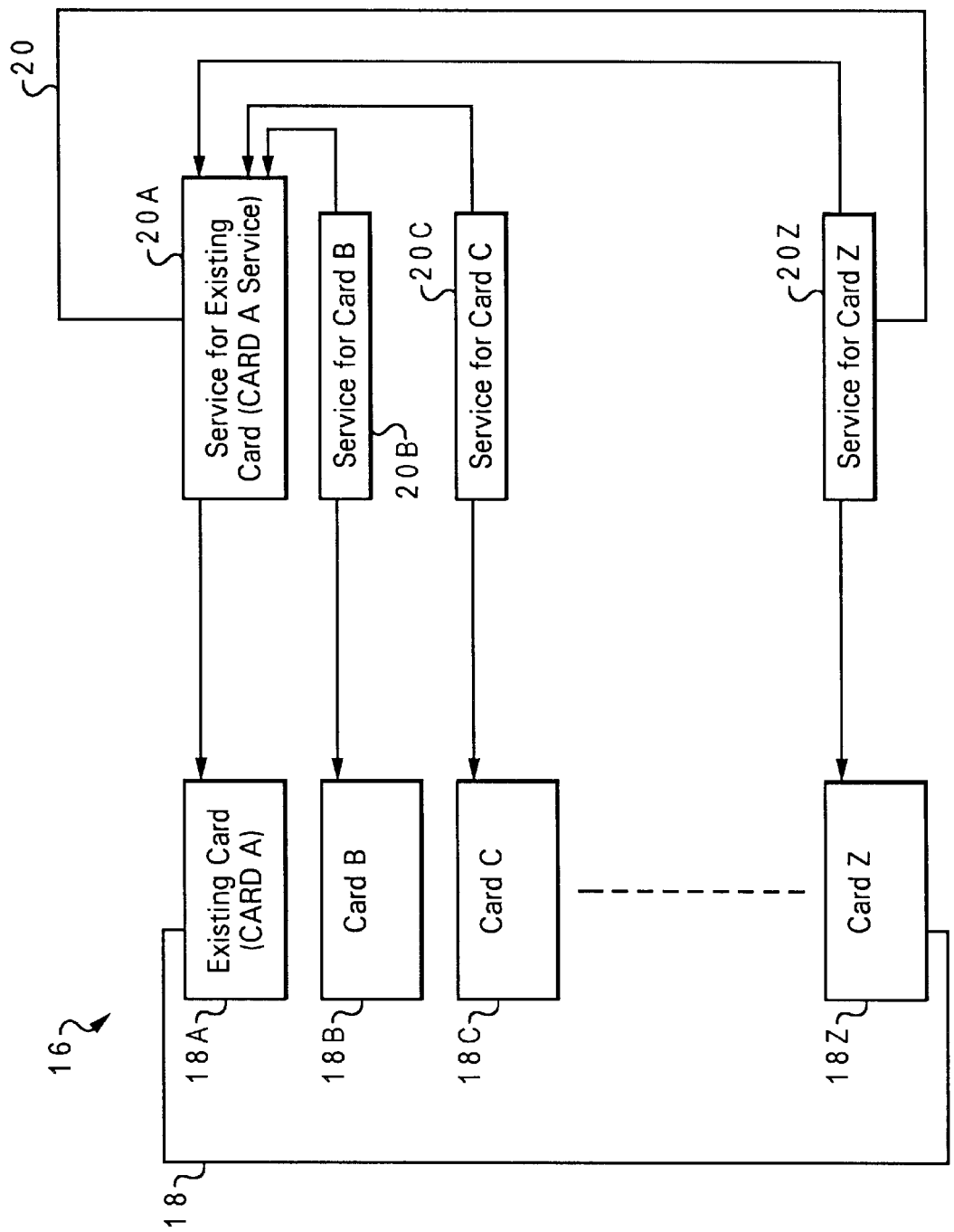
FIG. 3 is a block diagram illustrating the overloading of an existing card that has its own card service with card services of other cards.

With reference now to the figures and in particular with reference to FIG. 1, a block diagram 5 illustrating a general topology of and relationship between card terminals 14, a client system 12, users 15, card service providers ("CSPs") 17 with card service provider databases ("CSP DBs") 19, an overloaded card providing server system 10 that provides overloaded card services for overloaded cards, and an overloaded card manager server system 11 that manages each of the overloaded cards with their respective services and that provides the present invention billing/clearing house system and method for the overloaded card is shown. The overloaded card providing ("OCP") server system 10 provides the present invention overloading feature for an existing card 18 (i.e. such as designated OC 18A shown in FIG. 3). The OCP server system 10 is in communications with card terminals 14 either directly or through a client system(s) 12. For example, existing card 18A that is shown in FIG. 3 is read by a card terminal 14. The card terminal 14 communicates with the OCP server system 10 (directly or through a respective client system 12). The OCP server system 10, in turn, is able to set up and provide the present invention overloading card feature a designated or selected one of the existing cards 18.

The overloaded card manager ("OCM") server system 11 manages the overloaded card 18A and its respective overloaded card services 20. (The overloaded existing card 18A and its associated services 20 are shown in FIG. 3). The OCM server system 11 generally tracks and maintains information for an overloaded card 18A. For example, the OCM server system 11 maintains and tracks information of various cards 18 associated to the overloaded card 18A (such as account information, expiration date, personal identification number (PIN), etc.), information for contacting CSPs 17 of the various associated cards 18 when necessary or desired, and user information (such as user identification, user address, user telephone, user security information, etc.). The OCM server system 11 also provides the present invention billing/clearing house system and method for the overloaded card.

FIG. 1 shows that the OCM server system 11 is able to provide overloaded card managing services and billing/clearing house services for the overloaded card 18A to various users 15 (i.e. user A 15A, user B 15B, user C 1SC, . . . , user N 15N) each having an overloaded card. The users 15 are each able to communicate with the OCP server system 10 and/or the OCM server system 11. The OCM server system 11 is able to communicate to each of the CSPs 17 with respective card service provider databases ("CSP DBs") 19 (i.e. CSP A 17A with CSP DBA 19A, CSP B 17B with CSP DBB 19B, CSP C 17C with CSP DBC 19C, . . . , CSP Z 17Z with CSP DBZ 19Z). The OCM server system 11 communicates with a respective CSP(s) 17 when necessary or desired, such as when a user 15 wishes to make a change(s) or update(s) that affects the overloaded card services 20 of his/her overloaded card 18 (i.e. user information change, card 18 to be added and associated to the overloaded card 18A, card 18 to be deleted and disassociated from the overloaded card 18A, etc.) or when an overloaded card 18A has expired and has been replaced by a newly issued card 18A that is the same account but has a new expiration date or when a user 15 desires to change the overloaded card 18A from being designated one existing card 18 to another one of the existing card 18. The OCM server system 11 is also able to provide a user 15 with the information necessary to manage, track, and maintain the status and activity(ies) of the overloaded card 18A. The OCM server system 11 is able to automatically maintain and update information for a user 15 relating to the overloaded card 18A.

Figure 2:
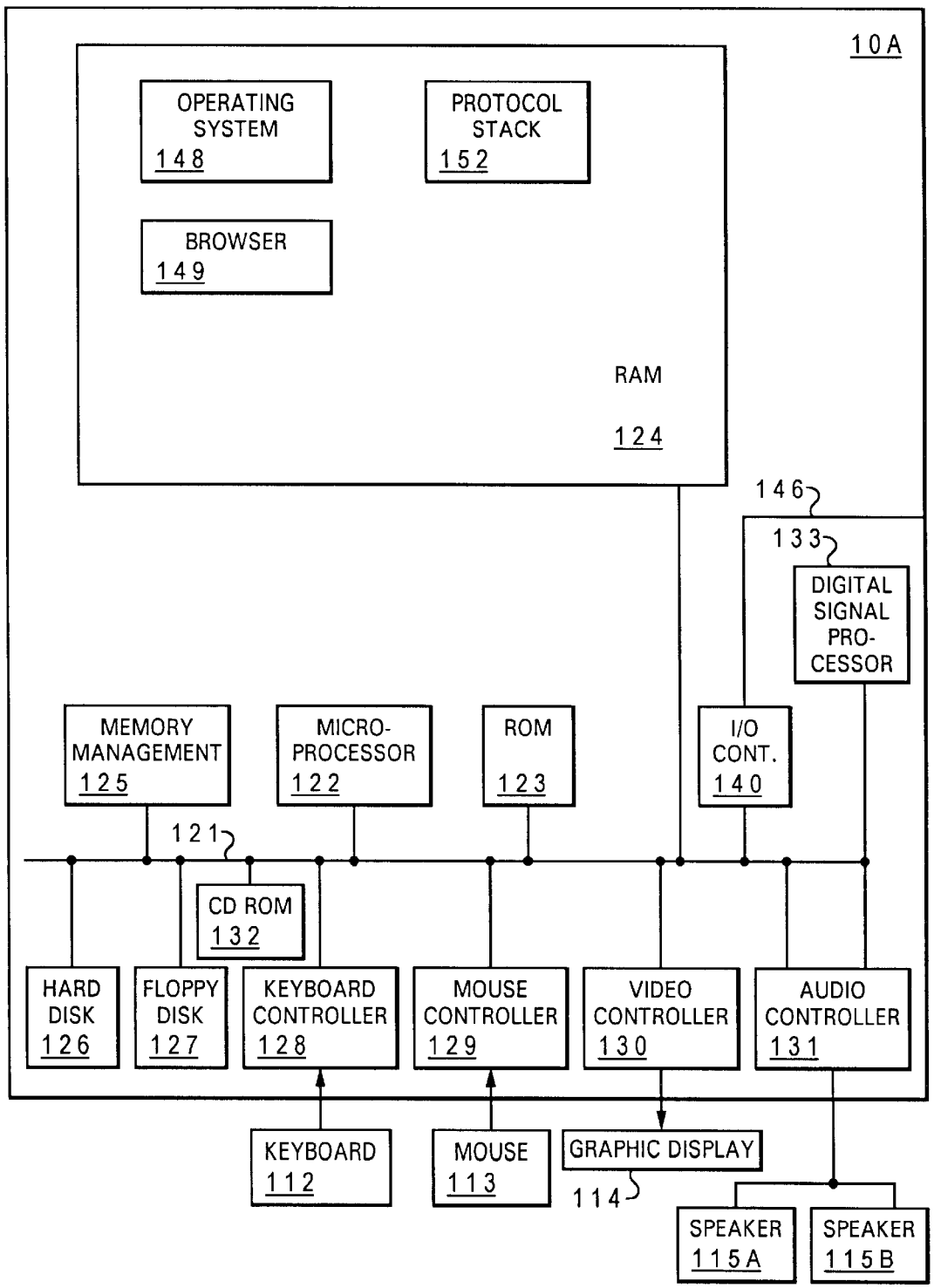
FIG. 2 is an overall example block diagram of a hardware system that may be the overloaded card providing server system, the overloaded card manager server system that provides the present invention billing services for the overloaded card, or the client system used in a system and method for overloading an existing card.

Referring to FIG. 2, an overall example block diagram of the hardware system 10A that may be the OCP server system 10, the present invention OCM server system 11, or the client system 12 used in a system and method for overloading an existing card is shown. The hardware system 10A is generally a networked system. The hardware system 10A has a number of sub-systems in communications with or to each other on a communications bus 121. The various sub-systems coupled to the bus 121 include but are not limited to the following systems or devices: a memory management system 125, a microprocessor 122, a read only memory (ROM) system 123, a random access memory (RAM) system 124, an input/output controller (I/O CONT.) 140, a digital signal processor 133, a hard disk 126, a floppy disk 127, a CD ROM 132, a keyboard controller 128, a mouse controller 129, a video controller 130, and an audio controller 131. The I/O CONT. 140 provides communications to an input/output device via line 146. A keyboard 112 is coupled to the keyboard controller 128. A mouse 113 is coupled to the mouse controller 129. A graphic display 114 is coupled to the video controller 130. Speakers 11SA and 115B are coupled to the audio controller 131. The RAM system 124 is divided into at least the following memory allocations: 1) operating system 148; 2) protocol stack 152; and 3) a browser or web browser 149. Furthermore, as an example, the card terminal 14 may be any system or device that is able to read data from the existing card 18A and that is able to communicate to a server system 10.

The present invention is not in any way limited to the specific topologies or configurations disclosed herein, and any system and method of providing overloading features to an existing card wherein the existing card has its own card service and is able to be overloaded with card services of other cards and any system and method for managing and providing billing/clearing house services for such an overloaded card may be used for the present invention. The present invention is also not in any way limited to the specific hardware disclosed above for the hardware system 10A, the OCP server system 10, the OCM server system 11, the client system 12, the card terminal 14, and any suitable system, sub-system, and/or device may be used to implement the present invention or in conjunction with the present invention. Furthermore, the OCP server system 10 and the OCM server system 11 are shown as separate systems in the figures, but they may also be easily combined in being provided by a single server system.

With reference to FIG. 3, a block diagram 16 illustrating the overloading of an existing card 18A (i.e. Card A) that has its own card service 20 (i.e. Card A service or CSA) with card services (i.e. CSB, CSC, . . . , CSZ) of other cards 18 (i.e. Card B, Card C, . . . , Card Z). The existing card 18A (i.e. Card A) is set up to be the overloaded card or the card with the overloaded feature. As shown in FIG. 3, the existing card 18A (i.e. Card A) has its own card service 20A (i.e. Card A service or CSA). The other cards 18 (i.e. Card B, Card C, . . . , Card Z) also have their own respective card services 20 (i.e. Card B service (CSB), Card C service (CSC), . . . , Card Z service (CSZ)). The present invention associates the card services 20 (i.e. CSB, CSC, . . . CSZ) of the other cards 18 (i.e. Card B, Card C, . . . Card Z) to the existing card 18A so that the existing card 18A is the only card that has to be used and accessed to be able to use its own card service 20 (i.e. CSA) as well as the other card services 20 (i.e. CSB, CSC, . . . , CSZ). The server system 10 is set up and programmed to provide the overloading feature. Preferences and settings for the card services 20 associated to the existing card 18A (i.e. Card A) may be set up so that a preferred order of use of the card services 20 for the various cards 18 is followed based on various situations and scenarios. As stated earlier, the overloaded card is disclosed in detail in the co-pending U.S. application Ser. No. 09/465, 292 entitled "SYSTEM AND METHOD FOR OVERLOADING AN EXISTING CARD".

Figure 4:
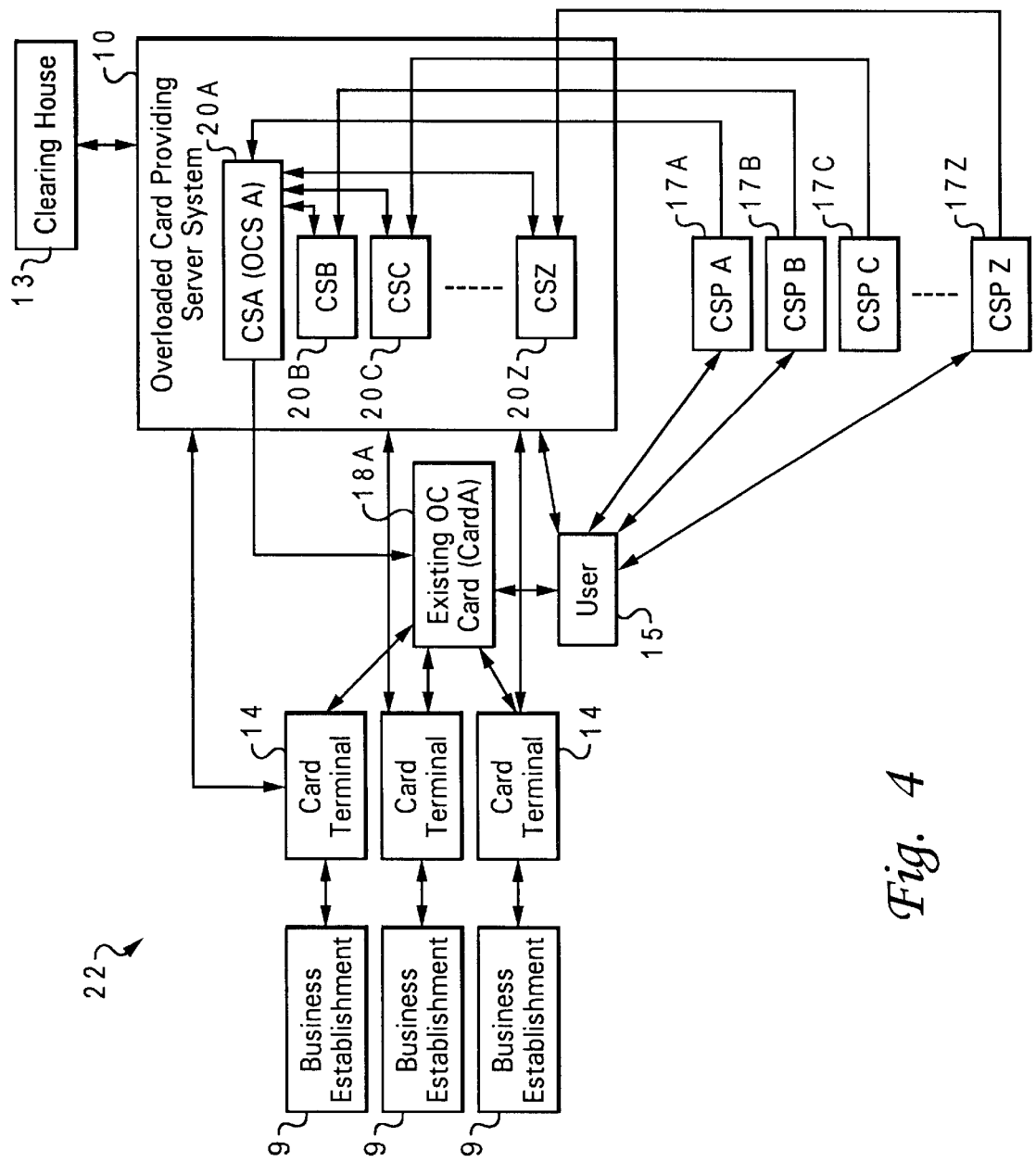
FIG. 4 is a block diagram illustrating management by a user of an overloaded card and its overloaded card services without the present invention overloaded card manager wherein management and consolidation of billing and/or clearing house services for the overloaded card are not provided.

Referring to FIG. 4, a block diagram 22 illustrating management by a user 15 of an overloaded card 18A and its overloaded card services 20 without the present invention overloaded card manager is shown. Management and consolidation of billing and/or clearing house services for the overloaded card 18A are not provided in FIG. 4. FIG. 4 shows that card A is designated and used as the existing overloaded card ("OC") 18A, and the OC 18A is able to be read and used at one of a number of card terminals 14. The card terminals 14 are each at a business establishment 9. The OC 18A is recognized as an overloaded card since the OCP server system 10 is in communication with each of the card terminals 14. The OCP server system 10 provides the existing OC 18A with the overloaded card services. FIG. 4 shows that OC 18A is provided the overloaded card services by providing to OC 18A (i.e. card A) the card service for card A ("CSA") as well as providing the associated card services (i.e. card service B ("CSB"), card service C ("CSC"), . . . , card service Z ("CSZ")) for each of the respective associated cards (i.e. cards B, C, . . . , Z). A card service provider (i.e. CSP A 17A, CSP B 17B, CSP C 17C, . . . , CSP Z 17Z) provides the respective card service for the corresponding card.

In FIG. 4, the management of the OC 18A (i.e. card A) and its related card services 20 has to be maintained by the user 15. For example, when a user 15 wishes to make a change(s) or update(s) that affects the overloaded card services 20 of his/her overloaded card 18A, then the burden is on the user 15 to make and/or track these changes. For example, if the user 15 wishes or needs to change any of the user information change, such as user address, user phone, and/or user security information, etc., then the user 15 as shown in FIG. 4 has to remember each associated card 18 and contact each and every CSP 17 (i.e. CSP A 17A, CSP B 17B, CSP C 17C, . . . , CSP Z 17Z) to provide the change of information the respective multiple number of times. Furthermore, if the user 15 wishes to add and associate a new card(s) 18 to the OC 18A (i.e. card A) or delete and disassociate a card(s) 18 from the OC 18A, then the user 15 has to manually track which cards 18 are associated to the OC 18A and which cards 18 are not associated to the OC 18A. Also, when the OC 18A (i.e. card A) has expired in its own card services (CSA) and has been replaced by a newly issued card 18A (i.e. newly issued card A) that is the same account but has a new expiration date, then the user may be hassled with having to program and re-initiate the newly issued card 18A as an OC 18A again by remembering and providing all of the previous information and settings associated to the previously issued card 18A.

Additionally, without any billing management, when the overloaded card 18A is used by a user 15, any transactions or charges are generally cleared through a clearing house 13 that is in communications with the OCP server system 10 to verify and check any limitations of the transactions or charges. Any unverified charges are not cleared and are rejected. For the charges that are cleared, the respective card service providers (CSPs) 17 receive the charges made at corresponding business establishments or vendors 9. The billing service providers for the card service providers (CSPs) 17, in turn, bill the user 15 for the transactions or charges made by using the overloaded card 18A. The user 15 receives bills from each of these respective card service providers (CSPs) 17 for the various accounts utilized on the overloaded card 18A. Thus, a summary of charges for the overloaded card 18A is not readily available, and the user 15 is not able to readily manage or track billing activities on his/her overloaded card 18A. The user 15 is not able to obtain a single bill summarizing all charges made by the overloaded card 18A. Also, a central clearing house for charges made on all accounts associated to the overloaded card 18A that would act as an efficient check and further security mechanism on charges made by using an overloaded card 18A is not provided.

Figure 6:
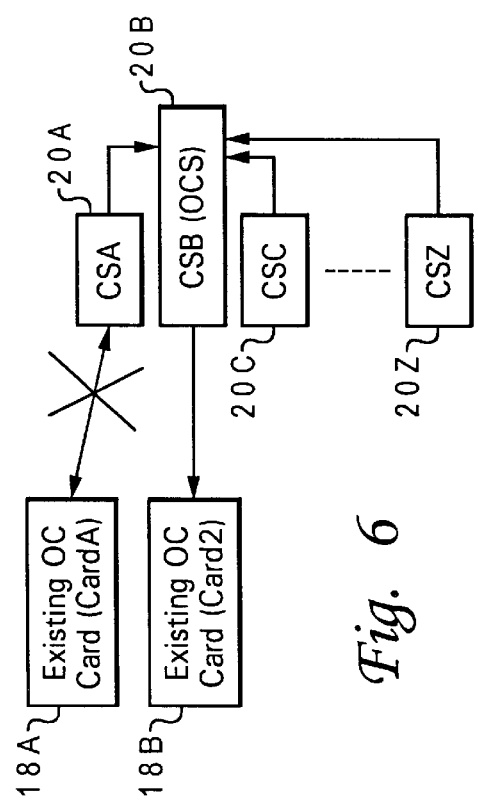
FIGS. 5 and 6 are block diagrams showing a user changing the overloaded card as being designated from one existing card to another existing card.
Figure 5:
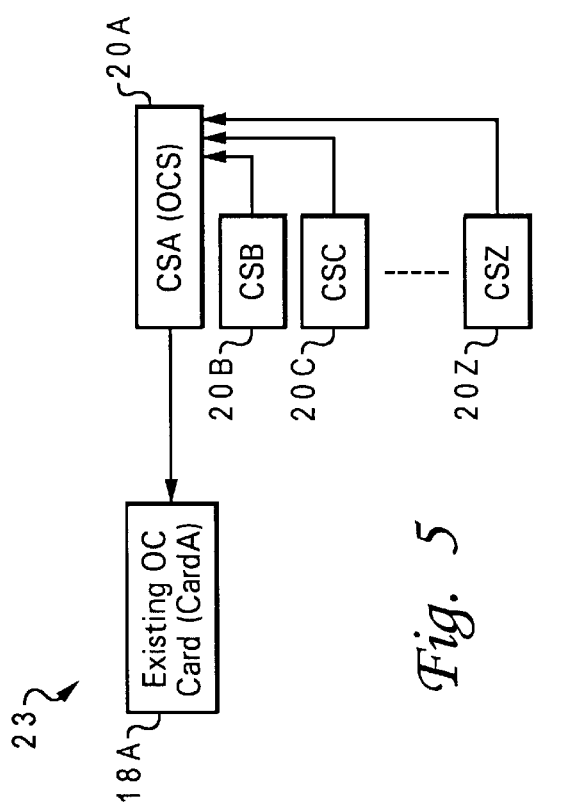

With reference to FIGS. 5 and 6, block diagrams 23 and 25 that illustrate a user changing the overloaded card as being designated from one existing card 18A (i.e. card A) to another existing card 18B (i.e. card B) are respectively shown. Block diagram 23 shows that the OC 18A is designated as existing card A. The OC 18A provides overloaded card services by providing its own card service (i.e. CSA) and card services for cards B, C, . . . , Z (i.e. CSB, CSC, . . . , CSZ). Block diagram 25 shows that the designation of OC 18A is changed from card A to card B. In block diagram 25, the former designated OC 18A (i.e. card A) is cancelled as being the overloaded card, and the newly designated OC 18B (i.e. card B) now provides the overloaded card services by providing its own card service (i.e. CSB) and card services for cards A, C, . . . , Z (i.e. CSA, CSC, . . . , CSZ).

When a user 15 desires to change the OC from being designated as one existing card 18A (i.e. card A) to another existing card 18B (i.e. card B) as shown in FIGS. 5 and 6, then the user 15 needs to track and remember all of the card information associated with the one existing card 18A, cancel the one existing card 18A (i.e. card A) as the overloaded card with its overloaded services, and set up and program the other card 18SB (i.e. card B) and its respective services with all of the information from the one existing card 18A (i.e. card A) and any other new information to designate and use this other card 18B as the OC. Furthermore, if the overloaded card system and method requires advising every CSP 17 of each associated card 18 as to which card 18 is being used as the designated OC, then the user 15 would have to contact each and every CSP 17 (i.e. CSP A 17A, CSP B 17B, CSP C 17C, . . . , CSP Z 17Z) and thus provide the new overloaded card designation the respective multiple number of times.

Figure 7:
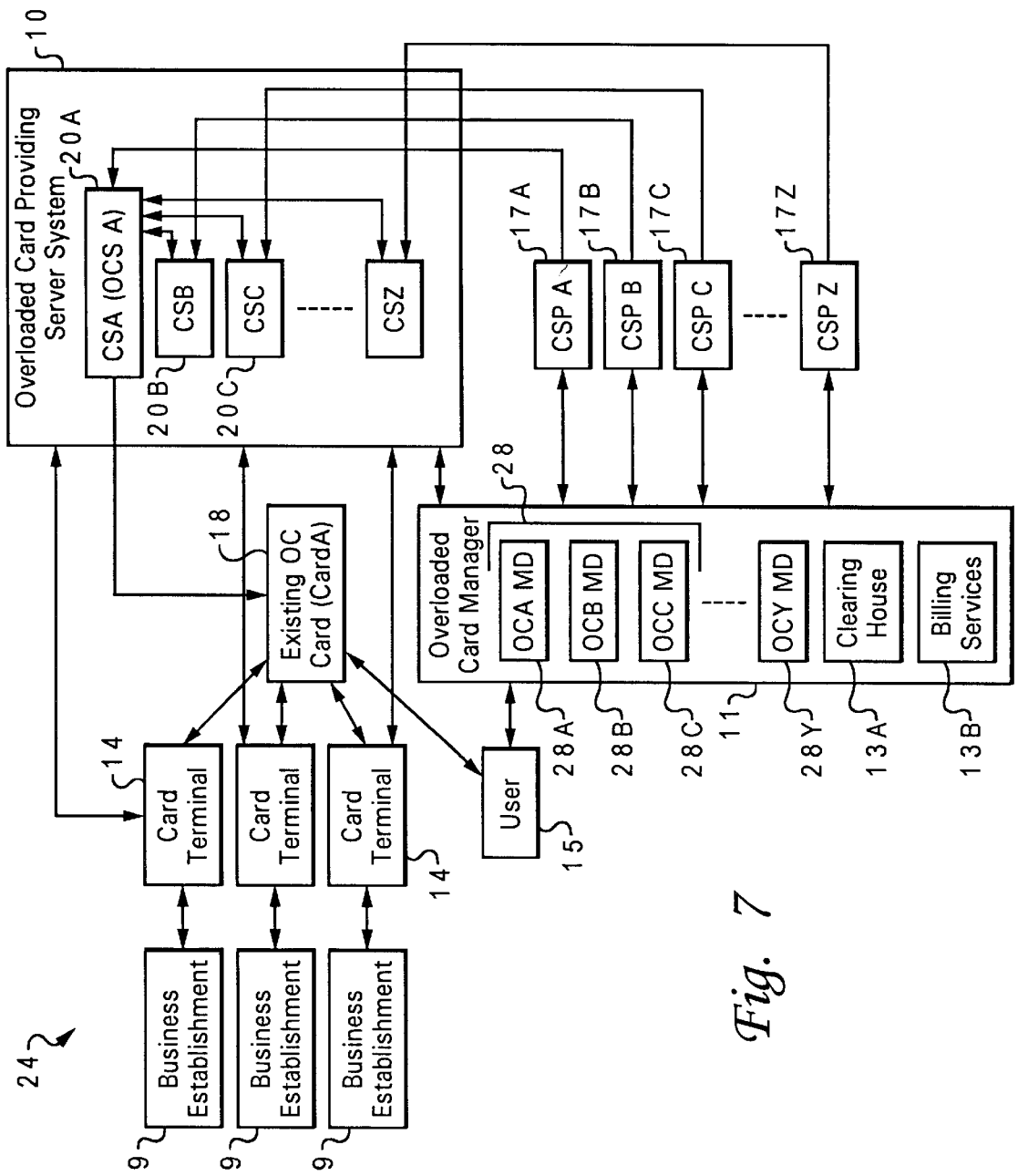
FIG. 7 is a block diagram illustrating management by the present invention overloaded card manager of an overloaded card and its overloaded card services, wherein the management also includes providing billing/clearing house services for the overloaded card.

Referring to FIG. 7, a block diagram 24 illustrating management by the present invention overloaded card manager (i.e. OCM server system) 11 of an overloaded card and its overloaded card services wherein the management also includes providing billing/clearing house services for the overloaded card is shown. The block diagram 24 of FIG. 7 is similar to the block diagram 22 of FIG. 4 except that the block diagram 24 provides the overloaded card manager or OCM server system 11 that manages the overloaded card 18A and that provides billing/clearing house services for the overloaded card 18A instead of the user 15 having to manage the overloaded card 18 and separately/multiply provide billing/clearing house services for the overloaded card 18A as shown in FIG. 4. The OCM 11 has management data 28 (i.e. overloaded card A management data (OCA MD) 28A, overloaded card B management data (OCB MD) 28B, overloaded card C management data (OCC MD) 28C, . . . , overloaded card Y management data (OCY MD) 28Y) for each overloaded card (i.e. overloaded card A (OCA), overloaded card B (OCB), overloaded card C (OCC), . . . , overloaded card Y (OCY)). The overloaded card management data 28 is used by the OCM 11 to manage the overloaded card 18 and to provide billing/clearing house services for the overloaded card 18A.

Figure 8:
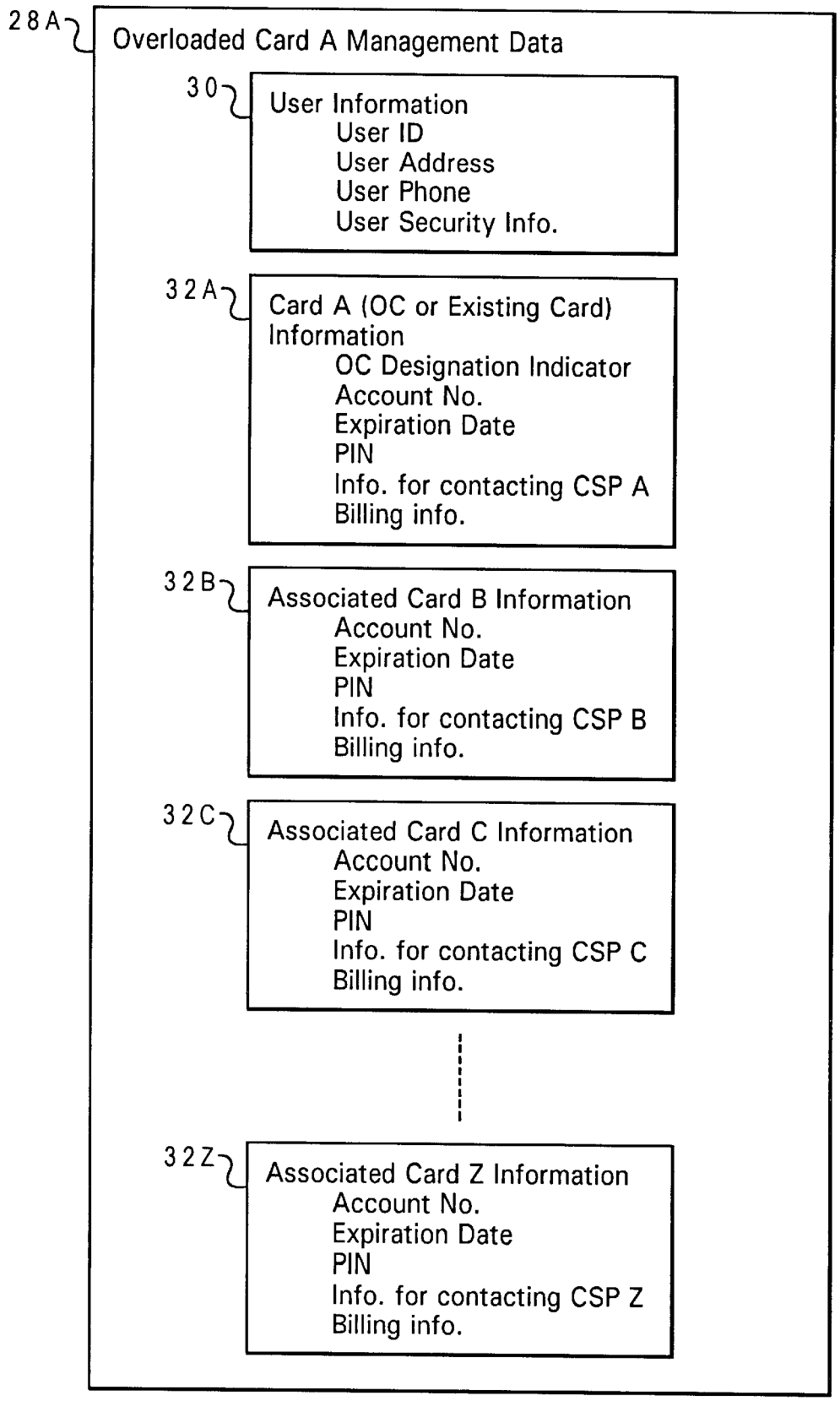
FIG. 8 is a block diagram illustrating an example format of management data for an overloaded card wherein the management data is used by the present invention overloaded card manager and wherein the management data includes billing information for providing billing/clearing house services for the overloaded card.

With reference now to FIG. 8, a block diagram illustrating an example format for OC management data 28A (i.e. OCA MD) is shown. Each of the OC management data 28 in the OCM 11 of FIG. 7 may have the same or similar type data and/or format, but the OC management data 28 is not limited in any way to any particular data or format. FIG. 8 shows that the OC management data 28A comprises user information 30 (such as user identification (ID), user address, user phone, user security information, etc.) and card information 32A, 32B, 32C, ..., 32Z. The card information includes existing OC card A information 32A (such as an OC designation indicator that indicates the card is a designated OC, account information, expiration date, PIN, and information for contacting CSP A, and billing information), associated card B information 32B (such as account information, expiration date, PIN, and information for contacting CSP B, and billing information), associated card C information (such as account information, expiration date, PIN, and information for contacting CSP C, and billing information) associated card Z information (such account information, expiration date, PIN, and information for contacting CSP Z, and billing information). The billing information may include transactions and charges made at various business establishments or vendors 9 and/or other such information. The billing information in the OC management data 28 is used and accessed to provide billing/clearing house services for the OC 18A.

FIG. 7 shows that, instead of the user 15 having to be in contact with each and every CSP 17, the OCM 11 is able to communicate with each and every CSP 17. The OCM 11 is able to be set up as the billing agent for all of the CSPs 17 and thus provide a consolidated bill or invoice 54 (i.e. see FIG. 10) for all charges made by the OC 18A. The OCM 11 is also in communications with the OCP server system 10 so that any change(s) made to overloaded card services for any overloaded card 18A is tracked and respectively updated by the OCM 11. Thus, changes relating to the overloaded card 18A may be made either by the user 15 directly communicating with the OCM 11 or by indirectly communicating to the OCM 11 through the OCP server system 10 or the use of the existing OC 18A or any other suitable manner. The OCM 11 allows any update(s) and/or change(s) to be efficiently made and provides current and updated overview, status, and card account information to the user 15.

When a user 15 wishes to make a change(s) or update(s) that affects the overloaded card services 20 of his/her overloaded card 18A (i.e. card A), the OCM 11 as shown in FIG. 7 assumes the burden and tasks from the user 15 to make and/or track these changes. For example, if the user 15 wishes or needs to change any of the user information, such as user address, user phone, and/or user security information, etc., then the user 15 as shown in FIG. 7 simply communicates with the OCM 11 (either directly or indirectly through the OCP server system 10 or OC 18A (i.e. card A)) to make the change. Thus, the user 15 inputs the respective change(s) that modifies the respective user information 30 in the OC management data 28, and the OCM 11 is programmed to communicate with all of the CSPs 17 by using the information for contacting the respective CSPs 17 to automatically update each and every CSP 17 with the change(s).

Furthermore, if the user 15 wishes to add and associate a new card(s) 18 to the OC 18A (i.e. card A) or delete and disassociate a card(s) 18 from the OC 18A, then the user 15 makes the change by directly or indirectly communicating with the OCP server system 10 to make such addition(s) or deletion(s). The OCM 11 is in communication with the OCP server system 10 such that it tracks and updates its respective OC management data 28 with any addition(s), deletion(s), or any other such modification(s) or change(s) made that affect or relate to the user's OC 18A (i.e. card A). Thus, a current/automatically updated status or overview of the associated cards and card services to the OC 18A is able to be easily/readily obtained by the user 15 without the user 15 having to manually track the cards 18 associated and not associated to the OC 18A.

Also, when the OC 18A (i.e. card A) has expired in its own card services (CSA) and has been replaced by a newly issued card 18A (i.e. newly issued card A) that is the same account but has a new expiration date, then the OCM 11 is able to contact the CSPA to verify the newly issued card and obtain and automatically update the new expiration date at all respective places and continue using the same account card A as the designated OC 18A. The user 15 avoids having to re-program the newly issued card 18A as the OC and does not have to remember and provide all of the previous information and settings associated to the previously issued card 18A.

Furthermore, when a user 15 desires to change the OC from being designated as one existing card 18A (i.e. card A) to another existing card 18B (i.e. card B) as shown in FIGS. 5 and 6, then the OCM 11 is used to be able to easily accomplish this task since it tracks and stores all of the current/updated card information associated with the one existing card 18A. The OCM 11 is able to easily cancel or be used to cancel the one existing card 18A (i.e. card A) as the overloaded card with its overloaded services and is able to easily set up/program or be used to set up/program the other card 18B (i.e. card B) and its respective services with all of the information from the one existing card 18A (i.e. card A) and any other new information to designate and use this other card 18B as the OC. Furthermore, if the overloaded card system and method requires advising every CSP 17 of each associated card 18 as to which card is being used as the designated OC, then the OCM 11 is able to easily, efficiently, and automatically contact each and every CSP 17 (i.e. CSP A 17A, CSP B 17B, CSP C 17C, ..., CSP Z 17Z) and thus conveniently provide the new overloaded card designation multiple times.

Since the OCM 11 is in contact with all of the respective CPSs 17 and the OCP server system 10 and tracks all changes and events affecting the OC 18A, the OCM 11 is able to provide a central billing service for consolidating all billing charges made by the OC 18A into one statement for a card holder or user 15. Furthermore, the OCM 11 is able to be a central clearing house for all charges made at business establishments or vendors 9.

FIG. 7 shows that the OCM 11 is able to be used as the clearing house 13A. When the overloaded card 18A is used by a user 15, all transactions or charges are able to be cleared through the central clearing house 13A of the OCM 11 that is in communications with the OCP server system 10 to verify and check any limitations of the transactions or charges. Any unverified charges are not cleared and are rejected by the OCM 11. The charges that are cleared are billed by the OCM 11 on behalf of all of the CSPs 17. The OCM 11 is a clearing house 13A and a billing agent for respectively tracking and billing all charges made to the respective corresponding business establishments or vendors 9 (i.e. provide billing services 13B).

The billing agent that uses the OCM 11, in turn, bills the user 15 for the transactions or charges made by the overloaded card 18A by sending a single consolidated bill 54 for all charges made for the overloaded card 18A wherein the consolidated bill provide transactions/charges and details for all associated card accounts. Thus, the consolidated bill 54 provides and makes readily available a summary of charges for the overloaded card 18A, and the user 15 is not able to readily manage or track billing activities on his/her overloaded card 18A. The present invention allows a user 15 to be able to obtain a single bill summarizing all charges made by the overloaded card 18A. Also, a central clearing house 13A for charges made on all accounts associated to the overloaded card 18A is provided. The central clearing house 13A acts as an efficient check and further security mechanism on charges made by the overloaded card 18A. Thus, the separate clearing house(s) 13 as shown in FIG. 4 is replaced by the central clearing house 13A of the OCM 11.

Figure 9:
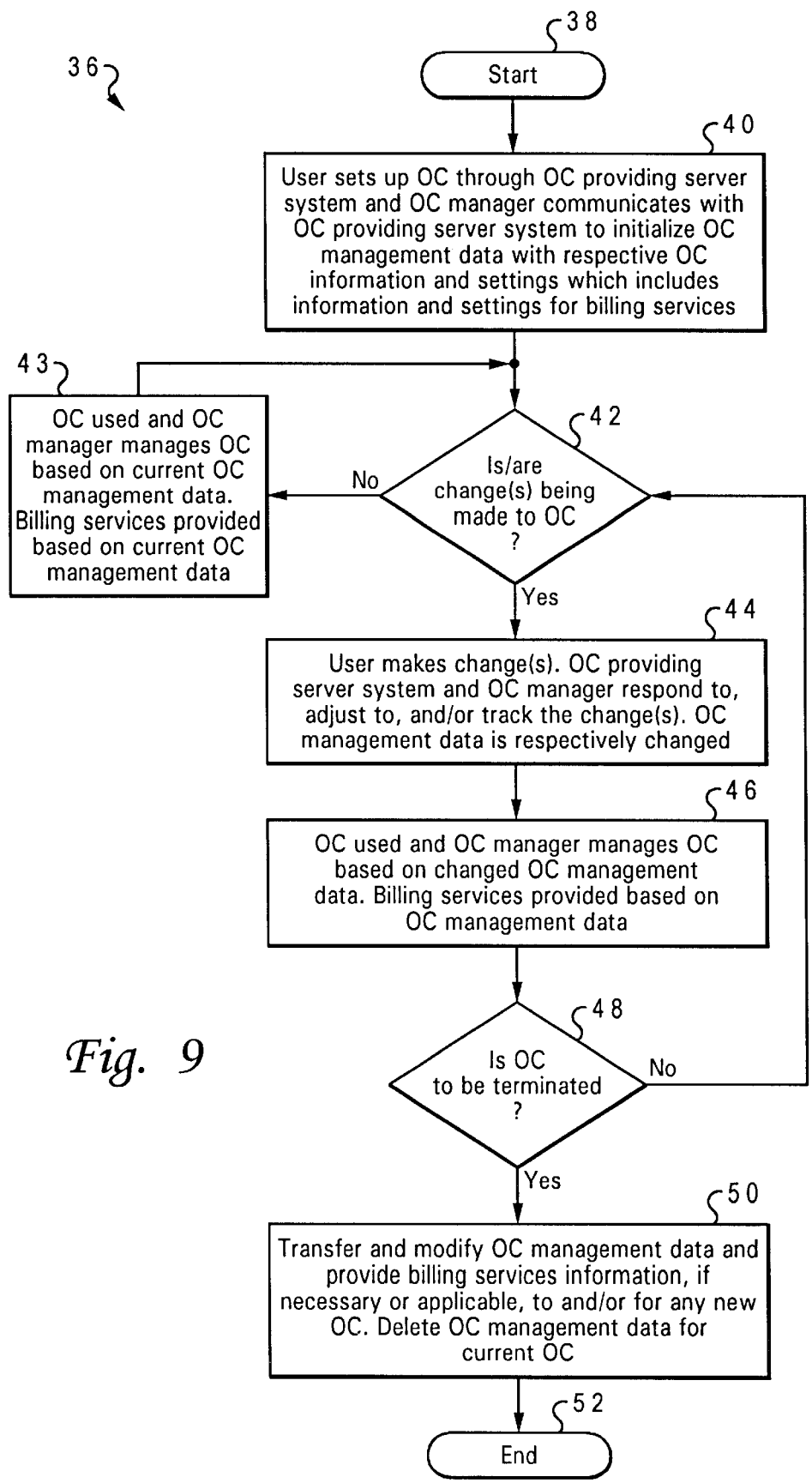
FIG. 9 is a flow chart of an algorithm for implementing and using the overloaded card manager for providing managing services and the present invention billing/clearing house services for the overloaded card.

Referring to FIG. 9, a flow chart of an algorithm 36 for implementing and using the overloaded card manager 11 for providing managing services and the present invention billing/clearing house services for the overloaded card is shown. The algorithm 36 starts at block 38 and moves to block 40. At block 40, the user 15 sets up the designated OC 18A through the OCP server system 10. The OCM server system 11 communicates with the OCP server system 10 to initialize the OC management data 28 with respective OC information and settings which includes information and settings for billing services. The algorithm 36 moves to decision block 42 where the algorithm 36 determines whether any change(s) is/are being made that affect or relate to the OC 18A. If no changes are being made, then the algorithm 36 moves to block 43 where the OC 18A is used and the OCM 11 manages the OC 18A based on the current OC management data 28. Billing services are provided based on the current OC management data 28 as well. The algorithm 36 loops back before decision block 42 and continues therefrom.

On the other hand, if a change(s) is/are being made that affect or relate to the OC 18A, then the algorithm 36 moves from decision block 42 to block 44. At block 44, the user 15 makes the change(s). The OCP server system 10 and the OCM server system 11 respond to, adjust to, and/or track the change(s). The OC management data 28 is respectively changed. The algorithm 36 moves to block 46. At block 46, the OC 18A is used and the OCM 11 manages the OC 18A based on the changed OC management data 28. Also, the billing services are provided based on the changed OC management data 28. The algorithm 36 moves to decision block 48 where the determination of whether the OC 18A is to be terminated is made. If the OC 18A is not to be terminated, then the algorithm 36 loops back to decision block 42 and continues therefrom. On the other hand, if the OC 18A is to be terminated, then the algorithm 36 moves to block 50. At block 50, the OC management data 28 is transferred and modified and billing services information is provided, if necessary or applicable, to any newly designated OC 18A. The OC management data 28 for the old OC 18A is deleted. The algorithm 36 ends at block 52.

Figure 10:
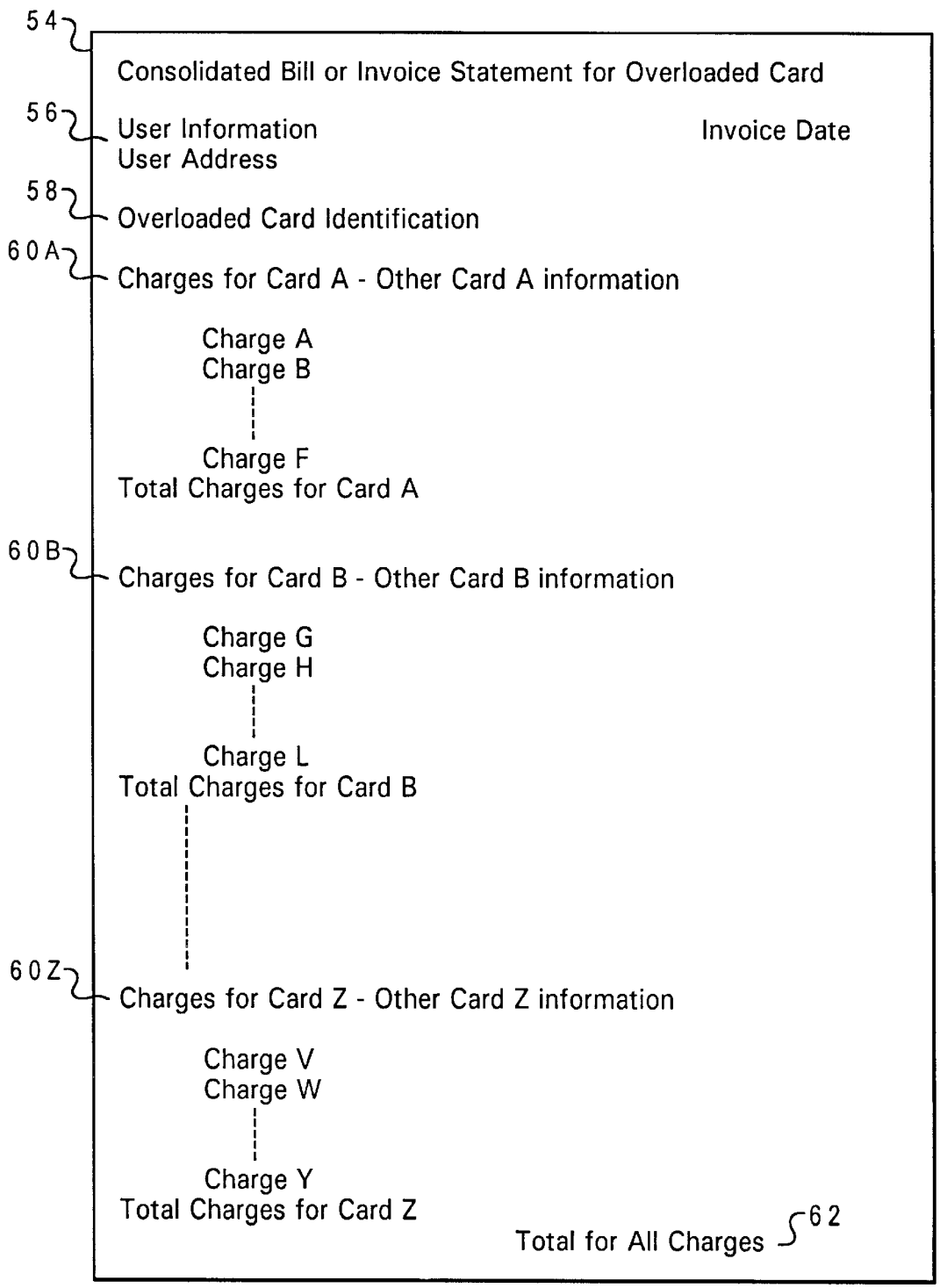
FIG. 10 is an example format of a consolidated bill or invoice statement for an overloaded card.

With reference now to FIG. 10, an example format of a consolidated or invoice statement 54 for an overloaded card 18A that is sent to the respective card holder or user 15 of OC 18A is shown. The consolidated statement 54 contains the invoice date (which may include the transaction or charge period), user information 56 (i.e. user name, user address, etc.), overloaded card identification information 58 charges for card A 60A and other card A information (i.e. charge A, charge B . . . , charge F. total charges for card A), charges for card B 60B and other card B information (i.e. charge G. charge H . . . , charge L, total charges for card B), . . . , charges for card Z 60Z and other card Z information (i.e. charge V, charge W, . . . , charge Y, total charges for card Z), and a total for all charges. The consolidated bill or invoice for the present invention is not limited to any specific format or data, and any suitable format or data may be used for providing the consolidated bill or invoice for the present invention.

While the invention has been particularly shown and described with reference to a preferred embodiment, it will be understood by those skilled in the art that various changes in form and detail may be made therein without departing from the spirit and scope of the invention.

What is claimed is:

1. A method for managing and providing billing services to a user of a host card having multiple card services, comprising the steps of:

overloading a host card that has an associated card service with at least one other service of at least one other card, maintaining and storing within a database, card management data that contains card service account information that relates the host card with the account status of the at least one other card service of all of the at least one other card, managing the host card with the at least one other card service within a networked server independent of altering any data on the host card, wherein said managing includes:

responsive to a specified vendor establishment being designated as associated with one of said at least one other card service, automatically charging said one of said at least one other card service when said host card is used at said specified vendor establishment, and charging another of said at least one card service responsive to no specified vendor being designated, and in response to processing a transaction with respect to one of said at least one other card service, associating the card service account information maintained within said database to said host card within a centralized clearing house, such that transactions performed with said host card may be centrally cleared and processed.

2. The method according to claim 1, wherein the step of associating the card service information maintained within said database further comprises the step of:

clearing the transactions before billing the transactions to the user.

3. The method according to claim 2, further comprising the step of:

using a central clearing house for clearing the transactions.

4. The method according to claim 3, wherein the central clearing house is made part of an overloaded card manager that manages the overloaded card.

5. The method according to claim 1, wherein the step of associating the card service information maintained within said databas further comprises the step of:

consolidating all information relating to the transactions on a single statement that is provided to the user.

6. The method according to claim 5, further comprising the step of:

using a central billing service provider system for consolidating all of the information relating to the transactions on the single statement.

7. The method according to claim 6, wherein the central billing service provider system is made part of an overloaded card manager that manages the overloaded card.

8. The method according to claim 5, further comprising the step of:
   summarizing the consolidated information and the transactions on the single statement.

9. A system of providing, using, and managing a card with a card service and providing billing services to a user of the card, comprising:
   means for overloading a host card that has an associated card service with at least one other service of at least one other card,
   means for maintaining and storing within a database, card management data that contains card service account information that relates the host card with the account status of the at least one other card service of all of the at least one other card,
   means for managing the host card with the at least one other card service within a networked server independent of altering any data on the host card, wherein said managing includes:
      means responsive to a specified vendor establishment being designated as associated with one of said at least one other card service, for automatically charging said one of said at least one other card service when said host card is used at said specified vendor establishment, and
      means for charging another of said at least one card service responsive to no specified vendor being designated, and
   means responsive to processing a transaction with respect to one of said at least one other card service, for associating the card service account information maintained within said database to said host card within a centralized clearing house, such that transactions performed with said host card may be centrally cleared and processed.

10. The system according to claim 9, wherein the means for managing the host card maintains and stores overloaded card management data that contains billing information relating to the host card and the at least one other card service, tracks a change, if any, made to the host card and the at least one other card service, updates the overloaded card management data to reflect the change, and performs appropriate actions in response to the change.

11. The system according to claim 9, wherein the transactions are cleared before billing the transactions to the user.

12. The system according to claim 11, further comprising:
   a central clearing house used for clearing the transactions.

13. The system according to claim 12, wherein the central clearing house is made part of the means for managing the host card.

14. The system according to claim 9, wherein all information relating to the transactions are consolidated together into a single statement that is provided to the user.

15. The system according to claim 14, further comprising:
   a central billing service provider system used for consolidating all of the information relating to the transactions on a single statement.

16. The system according to claim 15, wherein the central billing service provider system is made part of the means for managing the host card.

17. The system according to claim 14, wherein the consolidated information and the transactions are summarized on the single statement.

18. A program product for managing and providing billing services to a user of a host card having multiple card services, comprising:
   instruction means for overloading a host card that has an associated card service with at least one other service of at least one other card,
   instruction means for maintaining and storing within a database, card management data that contains card service account information that relates the host card with the account status of the at least one other card service of all of the at least one other card,
   instruction means for managing the host card with the at least one other card service within a networked server independent of altering any data on the host card, wherein said managing includes:
      instruction means responsive to a specified vendor establishment being designated as associated with one of said at least one other card service, for automatically charging said one of said at least one other card service when said host card is used at said specified vendor establishment, and
      instruction means for charging another of said at least one card service responsive to no specified vendor being designated, and
   instruction means responsive to processing a transaction with respect to one of said at least one other card service, for associating the card service account information maintained within said single database to said host card within a centralized clearing house, such that transactions performed with said host card may be centrally cleared and processed.

19. The program product according to claim 18, wherein said computer usable media is a memory media.

20. The program product according to claim 18, wherein said computer usable media bearing is a floppy disk.

* * * * *